United States Patent [19]

McWhorter et al.

[11] 4,300,355

[45] Nov. 17, 1981

[54] IN-LINE LIN SLUSH MAKING FOR CONCRETE COOLING

[75] Inventors: Thomas E. McWhorter, Whitehall; Haunani Kekuna, Macungie; Brian L. Gabel, Northampton; Eric C. Osmundson, Bethlehem, all of Pa.

[73] Assignee: Air Products and Chemicals, Inc., Allentown, Pa.

[21] Appl. No.: 165,816

[22] Filed: Jul. 3, 1980

[51] Int. Cl.³ .................................................. F17C 11/00
[52] U.S. Cl. ........................................... 62/48; 62/66; 62/74; 106/97
[58] Field of Search .............. 62/48, 66, 74; 106/97, 106/98, 99

[56] References Cited

U.S. PATENT DOCUMENTS

| | | | |
|---|---|---|---|
| 3,643,002 | 2/1972 | Minnich ............................. | 62/55 |
| 3,646,998 | 3/1972 | Curtice et al. .................... | 106/98 |
| 3,672,182 | 6/1972 | Stowasser et al. ................ | 62/98 |
| 3,730,201 | 5/1973 | Lefever ............................. | 62/55 |
| 4,052,220 | 10/1977 | Turpin, Jr. ....................... | 106/97 |
| 4,206,610 | 6/1980 | Santhanam ....................... | 62/55 |

*Primary Examiner*—Ronald C. Capossela
*Attorney, Agent, or Firm*—Thomas G. Ryder; E. Eugene Innis; James C. Simmons

[57] ABSTRACT

A process for producing a flowable liquid-solid mixture by freezing a portion of a flowing liquid stream through direct contacting with a cryogen to form a "slush" comprised of discrete particles of frozen solid in the liquid stream.

10 Claims, 1 Drawing Figure

IN-LINE LIN SLUSH MAKING FOR CONCRETE COOLING

This invention is directed to a process for producing a flowable liquid-solid mixture composed of a liquid mixed with discrete frozen particles of the liquid.

In various industrial processes wherein an initial relatively low temperature or wherein heat removal is required it has been suggested to provide cooling through the means of introducing to the process one or more of the ingredients which has been previously cooled. Illustrative of processes of this type are concrete production and the synthesis of certain dye stuffs. The particular suggestions to be utilized with such processes include the cooling of one of the ingredients, preferably a liquid ingredient, such as, for example the cooling of water being introduced into a concrete production operation. In many situations, however, the amount of cooling or the amount of heat which can be removed or accommodated in this fashion is less than is desired and further steps must be taken. In this regard it has also been suggested that if one of the ingredients is a liquid which can be frozen, for example water, it might be possible to add this ingredient in its solid form thereby taking advantage of the additional degree of cooling provided by the heat fusion of the substance. Theoretically, such direct cooling by addition of a frozen material is a potentially, highly advantageous technique, inasmuch as the amount of heat absorbed during the melting of the frozen ingredient is quite significant. Thus, for example, the heat absorbed during the melting of one pound of ice is one hundred forty-four times that absorbed in the raising of one pound of liquid water one degree Fahrenheit.

The direct cooling approach by the addition of ice has been suggested for utilization in connection with aqueous reaction mixtures, such as in the dye stuff industry. More recently, it has been suggested to add ice to concrete mixes in order to retard the setting process and thereby to enhance the quality of the finished concrete. It has been proposed in connection with such processes that the ice to be employed be added separately from liquid water specified in the recipe or reaction instructions. Such technique presents a problem in measuring accurately the exact quantity of ice employed, which in turn introduces an inaccuracy in insuring that the proper quantity of water be added to the process. In many instances the quantity of water employed is critical to obtaining a good product. Thus, if too much water is added to a concrete mix, the strength of the finished product will suffer. Conversely, if insufficient water is added to the concrete mix then difficulty is encounted in stirring, pouring and compacting the mix in addition to possible deleterious effects upon the strength of the concrete due to improper bonding.

In addition to the general inaccuracies inherent with the previously proposed techniques, there has been a substantial cost factor which militates against the employment of previous suggestions. Thus, in any process where a significant amount of ice must be employed the utilization of large pieces of ice, e.g. one hundred pound blocks, is not feasible and the cost of machinery for crushing large quantities of ice in short periods of time is quite high.

It has also been suggested to employ a cryogen; e.g., liquid nitrogen (LIN), for the indirect cooling of reaction products, such as concrete, by passing the cryogen into a tank containing the liquid, e.g., water, and cooling the liquid to a level approaching the freezing point of the liquid. Apparatus for practicing this suggestion is described in U.S. Pat. No. 3,672,182. Such prior art techniques are effective as far as they go, however, when further cooling is attempted by introducing more cryogen, large chunks of ice are formed which cannot readily be introduced into or accommodated in the process to be cooled. Furthermore, even if a mixture of small particles of ice in water could be formed in a tank, such would still be subject to a series of shortcomings including the loss of cooling capacity due to warming during storage, the tendency of the ice to separate from the water and non-uniform and unpredictable cooling capability.

The process of this invention provides a simple and convenient method for producing a slush of predictable solid (ice) content and, thus, cooling capacity.

DESCRIPTION OF THE PRESENT INVENTION

The present invention provides a process whereby a liquid-solid mixture is produced in which the solid is the frozen form of the liquid part of the mixture. The present process also provides such a liquid-solid mixture which is flowable and which mixture is formed from a pre-measured portion of the liquid component of the process.

More specifically, this invention is directed to a process for producing a flowable liquid-solid mixture comprised of a continuous liquid phase and a discontinuous solid phase in which the solid phase is in the form of discrete, frozen particles of the liquid. The process comprises flowing a stream of the liquid through a closed conduit while introducing a cryogen into the flowing liquid stream so as to flow cocurrently with the liquid stream. Through this contacting of the cocurrently flowing liquid and cryogen, the refrigeration capacity of the cryogen effects freezing of a portion of the liquid. Due to the fact that the liquid stream is moving and agitation is created by the expanding cryogen, the liquid freezes into small discrete solid particles thereby forming the liquid-solid mixture. Subsequent to the formation of the liquid-solid mixture, referred to as "slush", the slush is then discharged from the conduit.

In the conduct of the process of this invention it has been found that the initial temperature of the liquid stream, i.e. before contact with the cryogen, is generally an important consideration. If the initial temperature of the liquid stream is too high relative to its freezing point, an adequate quantity of liquid will be frozen to provide a slush mixture having a minimum desirable quantity of solids. Accordingly, therefore, the temperature of the liquid stream into which the cryogen is introduced is to be established at a temperature approaching the freezing point of the liquid. Generally, this temperature is not more than about 10° F. above the freezing point of the liquid.

On the other hand, however, there are reasons for maintaining the initial temperature of the liquid stream somewhat above the freezing point of the liquid. As will be understood, the refrigeration capacity of liquid cryogens is great simply due to their extremely low temperatures. The contacting of a liquid cryogen with a normally liquid material at its freezing point would tend to result in substantially instantaneous freezing of the normally liquid material with concomitant formation of frozen solid material on and about the cryogen inlet means. While this formation of solid material on the cryogen inlet means can be overcome through the utilization of a heated lance such as that described in U.S. Pat. No. 3,672,182, it is preferred to solve the problem by utilizing an initial temperature for the flowing stream which is at least about 2° F. greater than the freezing point of the particular liquid of the stream. Further, when selecting the particular temperature to be maintained in the flowing stream prior to contact with the cryogen it is preferred to employ a temperature which is less than about 8° F. and even more preferably is less than about 6° F. greater than the freezing point of the flowing stream. At the other end of the spectrum, however, there would not appear to be any advantage to employing a temperature for the flowing liquid stream which is greater than about 4° F. above the freezing point of the flowing liquid stream.

In the operation of this process, it is also important to maintain a minimum flow velocity of the flowing liquid stream in order to insure a constant movement of the normally liquid material beyond the point at which the liquid cryogen is introduced, thus, not only avoiding the formation of solids at the point of introduction of cryogen, but also insuring the elimination of any quiescent conditions within the conduit which might lend themselves to the formation of large particles of frozen solid material. In this connection it has been found that a superficial flow velocity of at least about 1.5 ft. per second is satisfactory. Preferably, the superficial velocity of the flowing liquid stream is at least about 2 or 2.5 ft. per second, with superficial flow velocities of at least about 3 ft. per second being particularly preferred. Normally, there is no advantage to be gained in using superficial flow velocities in excess of about 15 ft. per second. Superficial velocity is calculated based upon the assumption that the particular fluid being considered occupies the complete cross section of the conduit and disregards the presence of any other fluids which may also be in the conduit. Thus, the superficial velocity of the flowing liquid is calculated by dividing the flow rate of the liquid (expressed as volumes per unit time) by the cross-sectional area of the conduit yielding a velocity (expressed as units of length per unit of time). This calculation is made without regard to space actually occupied by the cryogen within the conduit.

As will be understood, the contact time between the cryogen and the flowing liquid stream can vary substantially depending upon a variety of factors including the size of the conduit, the length of the conduit and the relative amounts of liquid of the flowing stream and cryogen being employed. Usually, this contact time, measured as the time interval from the introduction of the cryogen to the discharge of the slush, can be as low as about 0.001 seconds. Preferably the contact time will be at least 0.002 seconds and more preferably will be greater than about 0.005 seconds. As a practical matter, the contact time should be limited to something less than about 10 seconds, since most of the heat absorption by the cryogen occurs within a very short interval after introduction and contact with the flowing stream of liquid. Accordingly, contact times of less than about 5 seconds and even less than about 3 seconds are quite satisfactory. Typically contact times will be at less than about 2 seconds.

In order to effect this rapid and efficient formation of the slush mixture, it is important that a minimum weight ratio of cryogen to liquid of the flowing stream be maintained. It has been found that this weight ratio is to be at least about 0.05:1 and generally will be at least about 0.1:1 with ratios greater than about 0.2:1 being preferred. Conversely, it has been found that weight ratios in excess of about 2:1 provide no advantage and, accordingly, it is preferred to maintain such weight ratio at less than about 1:1.

When operating within the ranges of the parameters set forth above, the process of this invention can be employed to treat quantities of a liquid stream flowing at rates as high as about 200 gallons per minute, although flow rates would tend to be less than 150 gallons per minute. Typically, most employments of this invention would be operating at flow rates of less than about 100 gallons per minute or even less than about 80 gallons per minute. As a practical matter in order to maintain the flow velocity required, the flow rate of the liquid stream will generally be at least about 20 gallons per minute. Flow rates for the cryogen which are compatible generally range from at least about 3 gallons per minute up to about 100 gallons per minute. The flow rate of both the liquid and the cryogen are dependent, as will be understood, on factors such as the heat of fusion of the liquid, the refrigeration capacity of the cryogen, and the size of the conduit, among other things.

DESCRIPTION OF THE DRAWING

In order to define this invention more clearly, reference is made to the attached drawing which is a representation of an apparatus suitable for practicing the process of this invention in connection with the production of concrete.

Figure 1:
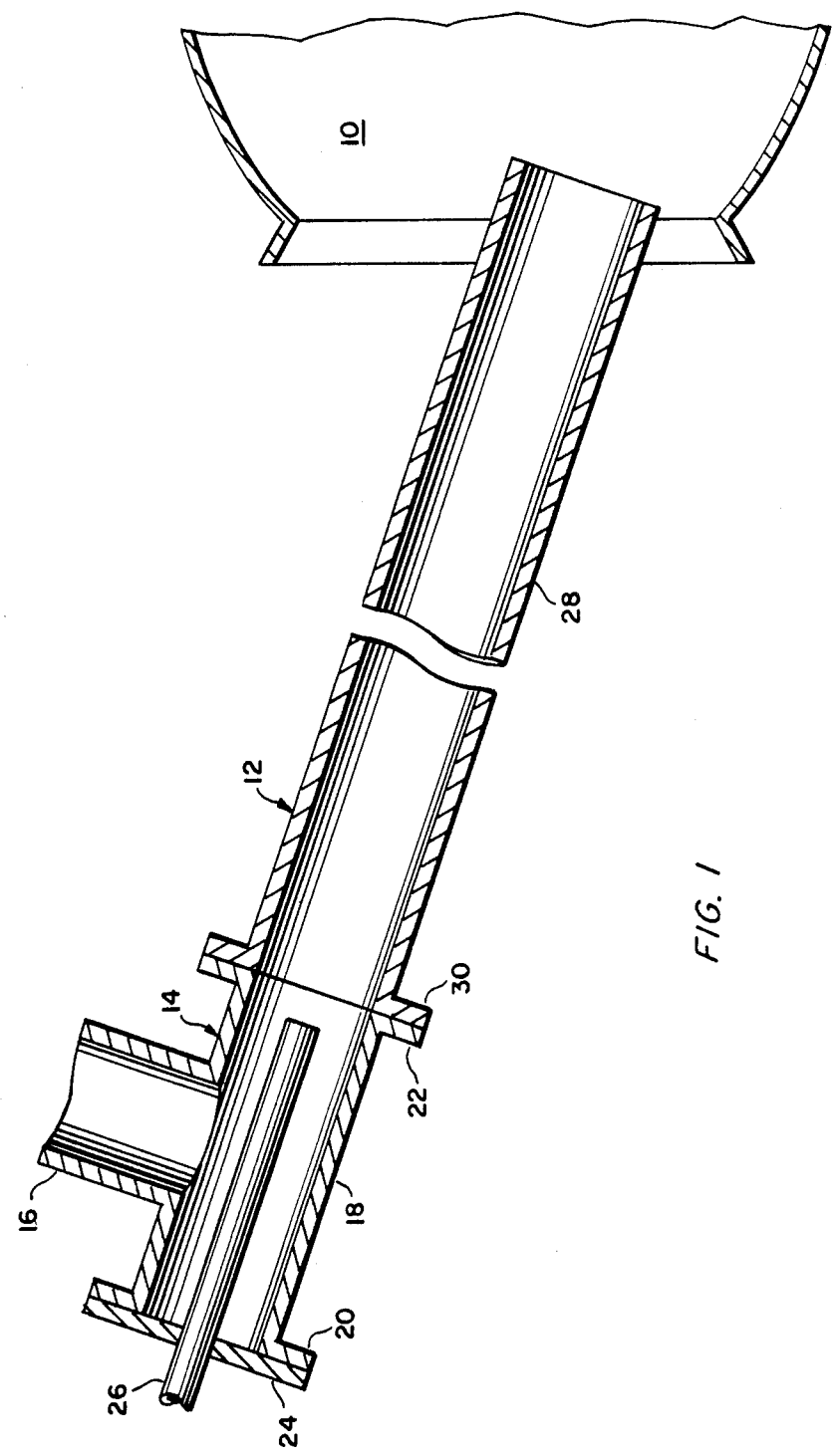
Referring now to FIG. 1 of the drawing, a concrete mixer is indicated by reference numeral 10. Also shown in the drawing is a slush making apparatus 12 embodying the present invention. At the end of the slush making apparatus 12 remote from the concrete mixer 10 is a tee joint 14 with the body 16 of the tee joint 14 constituting the water inlet line. The arm portion 18 of tee joint 14 is provided at its opposite ends with connecting flanges 20 and 22. As shown in the drawing flange 20 is at the end of the arm portion 18 remote from concrete mixer 10. Connected to flange 20 is seal 24 having an opening therethrough which establishes a sealing engagement with LIN (cryogen) inlet line 26 which at one end is connected to a source of LIN (not shown) while the other end of LIN inlet line 26 extends through the arm portion 18.

Flange 22 of tee joint 14 is connected to slush lance 28 by means of flange 30. In operation the water and LIN, which are brought together in tee joint 14, flow from tee joint 14 through slush lance 28 wherein the flowable mixture of ice and water are formed and thereafter the slush mixture is discharged from slush lance 28 to concrete mixer 10.

In more detail, the apparatus shown in the drawing operates by flowing water through water inlet line 16 into the arm portion 18 of tee joint 14. Simultaneously, a cryogen, for example, liquid nitrogen (LIN) is injected into tee joint 14 by means of LIN inlet line 26. Generally, the amount of water introduced via line 16 can be a predetermined quantity which is accurately measured in accordance with the particular recipe for concrete being followed at that time. With this known and predetermined quantity of water being introduced into the system, the required and desired quantity of LIN can be selected and introduced via LIN inlet line 26 in a quantity such that the heat of evaporation of LIN is sufficient to cool the quantity of water introduced via line 16 to its freezing point and additionally to freeze a desired and predetermined fraction of such water to the solid ice. The resulting mixture of water and solid ice (slush) is produced continuously and is introduced by means of slush lance 28 directly into the concrete mixer wherein it serves as a cooling medium for the concrete. Since the total flow of water into the system can be accurately measured and predetermined and further since the amount of cooling effected can be determined by the amount of LIN injected, both the water content and the temperature of the final concrete product can be precisely established.

In order to illustrate this invention in greater detail reference is made to the following examples.

EXAMPLE 1

In this example, an apparatus of the type illustrated in FIG. 1 of the drawings is employed to produce an ice-water slush mixture employing LIN as the cryogen. The liquid inlet line, the arms of the tee and the slush lance are sized to have an I.D. of three inches. The LIN inlet line is sized to have an I.D. of one inch. Various temperatures and flow rates for incoming water as well as various flow rates for LIN are employed in the series of runs of this example. Further, several different lengths for the slush lance varying from 3 to 20 feet are also employed. Depending upon the length of the slush lance and the flow rates, the contact times vary from about 0.02 to about 2 seconds. The various operating parameters for a plurality of runs are set forth in the following Table I.

TABLE I

| Run No. | 1 | 2 | 3 | 4 | 5 | 6 | 7 | 8 | 9 | 10 |
|---|---|---|---|---|---|---|---|---|---|---|
| Inlet H$_2$O Temp. °F. | 35 | 35 | 35 | 35 | 38 | 34 | 35 | 35 | | |
| H$_2$O Flow Rate GPM | 50 | 22 | 50 | 22 | 75 | 60 | 50 | 80 | | |
| H$_2$O Superficial Velocity fps | 2.12 | 0.96 | 2.12 | 0.96 | 3.26 | 2.60 | 2.12 | 3.48 | | |
| LIN Flow Rate GPM | 9.5 | 4.6 | 11 | 6 | 20 | 6 | 7 | 20 | | |
| LIN:H$_2$D lb/lb | 0.14 | 0.16 | 0.17 | 0.20 | 0.20 | 0.08 | 0.11 | 0.19 | | |
| % ice in slush | 14 | 15 | 16 | 21 | 16 | 6 | 8 | 15 | | |

We claim:

1. A process for producing a flowable liquid-solid mixture comprising a continuous liquid phase and a discontinuous solid phase, the solid being discrete, frozen particles of the liquid, which process comprises flowing a stream of the liquid through a closed conduit, introducing a liquid cryogen into the flowing liquid stream so as to flow cocurrently therewith, whereby the liquid-solid mixture is formed, and discharging the mixture from the conduit, the temperature of the liquid stream into which the cryogen is introduced being established within the range from about 2° F. above the freezing point of the liquid to about 10° F. above the freezing point of the liquid, the contact time between introduction of the cryogen and discharge of the mixture being maintained from about 0.001 to about 10 seconds, the superficial velocity of the flowing liquid being at least about 1.5 feet per second, and the weight ratio of cryogen to liquid being maintained from about 0.05:1 to about 2:1.

2. The process of claim 1 wherein the contact time is from about 0.002 to about 9 seconds.

3. The process of claim 1 wherein the contact time is at least about 0.005 seconds.

4. The process of claim 1 wherein the superficial flow velocity is from about 2 to about 15 feet per second.

5. The process of claim 1 wherein the ratio of cryogen to liquid is at least about 0.1:1.

6. The process of claim 1 wherein the ratio of cryogen to liquid is at least about 0.2:1.

7. The process of claim 1 wherein the liquid is water, the cryogen is liquid nitrogen, the temperature of the liquid stream is less than about 40° F., the contact time is from about 0.005 to about 5 seconds, the superficial flow velocity is at least about 2.5 feet per second and the ratio of liquid nitrogen to water is at least about 0.2:1.

8. The process of claim 1 wherein the liquid is flowed at a rate from about 20 to about 200 gallons per minute and the cryogen is flowed at a rate from about 3 to about 100 gallons per minute.

9. An improved process for the production of concrete of reduced temperature which comprises obtaining in predetermined quantities the ingredients for making concrete including cement, sand, aggregate and water, cooling the water to a temperature in the range from about 34° to about 38° F., flowing the cooled water through a closed conduit, introducing a predetermined quantity of a cryogen into the flowing water so as to flow cocurrently therewith, whereby at least 10% by weight of the water is frozen to form a slush comprising a discontinuous ice phase within the flowing water, the cocurrent flow of cryogen and water being maintained from about 0.005 to about 2 seconds, the superficial velocity of the flowing water being at least about 3 feet per second, the weight ratio of cryogen to water being from about 0.2:1 to about 1:1, discharging the mixture from the conduit into a concrete mixing chamber, introducing the other predetermined quantities of ingredients into the concrete mixing chamber and mixing the slush and other ingredients to produce concrete of reduced temperature.

10. The process of claim 9 wherein the cryogen is liquid nitrogen, the temperature of the cooled water being less than about 36° F. and the flow rate of the water being maintained in the range from about 30 to about 100 gallons per minute.

* * * * *